United States Patent
Zeichfüssl

(10) Patent No.: US 10,637,328 B2
(45) Date of Patent: Apr. 28, 2020

(54) SYNCHRONOUS RELUCTANCE MACHINE

(71) Applicant: SIEMENS AKTIENGESELLSCHAFT, München (DE)

(72) Inventor: Roland Zeichfüssl, Ruhstorf a. d. Rott (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 201 days.

(21) Appl. No.: 15/754,534

(22) PCT Filed: Jul. 28, 2016

(86) PCT No.: PCT/EP2016/068047
§ 371 (c)(1),
(2) Date: Feb. 22, 2018

(87) PCT Pub. No.: WO2017/032543
PCT Pub. Date: Mar. 2, 2017

(65) Prior Publication Data
US 2019/0027997 A1  Jan. 24, 2019

(30) Foreign Application Priority Data

Aug. 24, 2015 (EP) .................................. 15182109

(51) Int. Cl.
*H02K 1/32* (2006.01)
*H02K 9/22* (2006.01)
(Continued)

(52) U.S. Cl.
CPC .............. *H02K 9/18* (2013.01); *F03D 80/60* (2016.05); *H02K 1/12* (2013.01); *H02K 1/22* (2013.01);
(Continued)

(58) Field of Classification Search
CPC .................. H02K 1/22; H02K 1/32; H02K 1/325; H02K 7/183; H02K 9/005; H02K 9/02;
(Continued)

(56) References Cited

U.S. PATENT DOCUMENTS 3,260,874 A   7/1966  Robinson
4,286,182 A * 8/1981  Lenz ........................ H02K 1/32
                                                310/216.016
(Continued)

FOREIGN PATENT DOCUMENTS

CN   1784818 A      6/2006
DE   102 33 947 A1  2/2004
(Continued)

OTHER PUBLICATIONS

PCT International Search Report and Written Opinion of International Searching Authority dated Dec. 13, 2017 corresponding to PCT International Application No. PCT/EP2016/068047 filed Jul. 28, 2016.

*Primary Examiner* — Burton S Mullins
(74) *Attorney, Agent, or Firm* — Henry M. Feiereisen LLC

(57) ABSTRACT

A synchronous reluctance machine includes a stator and a rotor which is spaced apart from the stator by an air gap. The rotor rotatably mounted about an axis and includes laminations which are arranged axially one behind the other. Each lamination has an anisotropic magnetic structure which is formed by flux blocking sections and flux conducting sections. The flux blocking sections and flux conducting sections form poles of the rotor, with the flux blocking sections forming axially running channels and allowing an axial air flow. The laminated core of the rotor is axially subdivided into at least two component laminated cores, with radial cooling gaps being formed between the poles in the region (Continued)

of the q axis as viewed in a circumferential direction and between the component laminated cores as viewed axially.

15 Claims, 10 Drawing Sheets

(51) Int. Cl.
*H02K 9/00* (2006.01)
*H02K 19/00* (2006.01)
*H02K 9/18* (2006.01)
*H02K 1/24* (2006.01)
*F03D 80/60* (2016.01)
*H02K 1/12* (2006.01)
*H02K 1/22* (2006.01)
*H02K 7/18* (2006.01)

(52) U.S. Cl.
CPC .............. *H02K 1/246* (2013.01); *H02K 1/325* (2013.01); *H02K 7/183* (2013.01); *H02K 9/22* (2013.01); *F05B 2220/70642* (2013.01); *F05B 2260/20* (2013.01); *H02K 9/00* (2013.01)

(58) Field of Classification Search
CPC .. H02K 9/04; H02K 9/06; H02K 9/08; H02K 9/10; H02K 9/14; H02K 9/18; H02K 9/22; H02K 19/00; H02K 19/02; H02K 19/10; H02K 19/16; H02K 19/18; H02K 19/20; H02K 19/22; H02K 19/24
USPC ...................... 310/61, 162; 290/55
See application file for complete search history.

(56) References Cited

U.S. PATENT DOCUMENTS

| | | | | |
|---|---|---|---|---|
| 5,703,421 A | * | 12/1997 | Durkin | H02K 1/20 310/52 |
| 6,091,168 A | * | 7/2000 | Halsey | H02K 1/24 310/166 |
| 7,411,323 B2 | * | 8/2008 | Pfannschmidt | H02K 1/20 310/58 |
| 7,692,352 B2 | * | 4/2010 | Sirois | H02K 1/32 310/216.004 |
| 8,362,661 B2 | * | 1/2013 | DeBlock | H02K 1/20 310/52 |
| 8,686,608 B2 | * | 4/2014 | Lendenmann | H02K 1/325 310/61 |
| 9,051,922 B2 | | 6/2015 | Böing et al. | |
| 9,118,232 B2 | * | 8/2015 | Li | H02K 1/32 |
| 9,800,103 B2 | * | 10/2017 | Buttner | H02K 15/02 |
| 2007/0024129 A1 | | 2/2007 | Pfannschmidt et al. | |
| 2010/0060000 A1 | | 3/2010 | Scholte-Wassink | |
| 2011/0181137 A1 | | 7/2011 | Kori et al. | |
| 2012/0217756 A1 | | 8/2012 | Balzer et al. | |
| 2013/0099607 A1 | | 4/2013 | Lendenmann | |
| 2016/0372983 A1 | * | 12/2016 | Okochi | H02K 1/32 |
| 2017/0012481 A1 | * | 1/2017 | Ballweg | H02K 15/028 |

FOREIGN PATENT DOCUMENTS

| | | |
|---|---|---|
| DE | 10 2008 033 959 A1 | 2/2010 |
| DE | 10 2009 051 651 B4 | 1/2012 |
| DE | 10 2012 210 120 A1 | 12/2013 |
| EP | 2161443 A2 | 3/2010 |
| EP | 2 403 115 A1 | 1/2012 |
| EP | 2 589 132 B1 | 1/2014 |
| GB | 1 029 507 A | 5/1966 |
| GB | 2416566 A | 2/2006 |
| JP | S52111602 A | 9/1977 |
| KR | 100669047 B1 | 1/2007 |

* cited by examiner

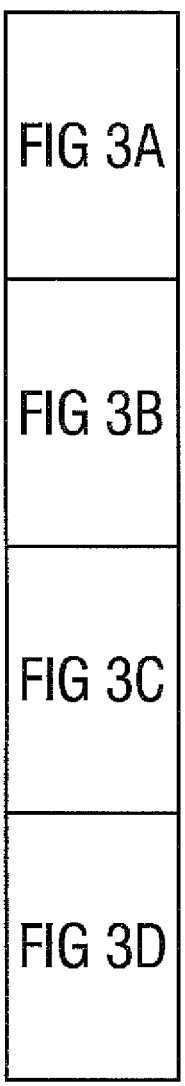
FIG 3
FIG 3A
FIG 3B
FIG 3C
FIG 3D
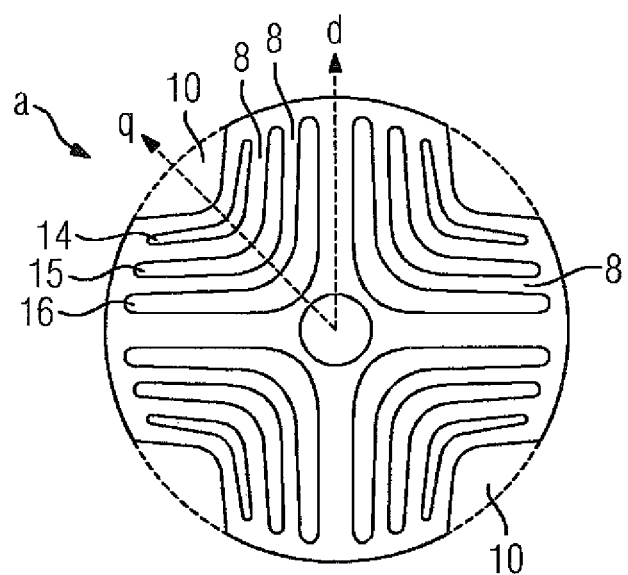
FIG 3A

SYNCHRONOUS RELUCTANCE MACHINE

CROSS-REFERENCES TO RELATED APPLICATIONS

This application is the U.S. National Stage of International Application No. PCT/EP2016/068047, filed Jul. 28, 2016, which designated the United States and has been published as International Publication No. WO 2017/032543 and which claims the priority of European Patent Application, Serial No. 15182109.7, filed Aug. 24, 2015, pursuant to 35 U.S.C. 119(a)-(d).

BACKGROUND OF THE INVENTION

The invention relates to a synchronous reluctance machine, in particular a motor or a generator of a wind power plant comprising a stator and a rotor which is spaced apart from said stator by an air gap and which is rotatably mounted about an axis, which has an anisotropic magnetic structure, which is formed by flux blocking sections essentially arranged axially one behind the other.

The invention likewise relates to a wind power plant with a generator designed in this way.

As a rule asynchronous machines with cage armatures or synchronous machines are used as dynamo-electric machines, i.e. motors or generators with a power of a few hundred kW and greater. However these machines have a rotor that is complex to manufacture, with a short-circuit cage or a pole winding.

Machines in this power class generally need a cooling of the rotor, since the losses arising there are no longer able to be dissipated solely by convection. Thus the rotor is usually cooled by cooling air, which is generated by self-ventilation or by outside ventilation. Moreover the stator of such a machine must be supplied evenly with cooling air over its entire axial length. With these machines described above a high power factor is frequently demanded, in order to minimize the proportion of reactive power that must be made available to operate the machine.

With dynamo-electric machines of this power class a distinction is essentially made between two types of primary cooling with air. On the one hand there are machines through which air flows only in an axial direction, such as is described for example in DE 2009 051 651 B4. In this invention a circulation of this type is combined with a water jacket cooling of the laminated core of the stator.

Furthermore there are dynamo-electric machines, in which the cooling air also flows radially through the machine, specifically through the stator. In order to make this possible, stator and rotor laminated cores are interrupted by radial cooling slots. This enables the surface onto which the air flows to be significantly enlarged.

Thus DE 10 2012 210 120 A1 describes a dynamo-electric machine with radial cooling slots in stator and rotor and a separate cooling circuit for the winding heads.

Disclosed in EP 2 403 115 A1 is a concept with radial cooling slots for a permanently excited synchronous machine.

A synchronous reluctance machine has the disadvantage, compared to the machines mentioned above, that the power factor is comparatively low and lies at around 0.7 to 0.75. For this reason this type of machine is hardly used at all in the power class of a few hundred kW and greater.

For example the cooling of a reluctance machine of a smaller power and size is described in EP 2 589 132 B1. In this arrangement the cooling air flows axially through flux barriers of the rotor. The stator is fully, laminated in the axial direction.

For machines of greater power this cooling is not suitable inter alia, since the ratio of volume to surface is too small and thus a sufficient cooling surface is not available.

SUMMARY OF THE INVENTION

Using this as its starting point, the underlying object of the invention is to create a synchronous reluctance machine, in particular for a higher power class of a few hundred kW and greater, which with sufficient cooling provides a comparatively high power factor. Furthermore the synchronous reluctance machine is to be suitable for use in wind power plants.

The object of the said task is successfully achieved by a synchronous reluctance machine, in particular a motor or a generator, with a power of greater than 300 kW, with a stator and a rotor spaced apart from said stator by an air gap and rotatably mounted about an axis, of which the laminations arranged axially one behind the other each have an anisotropic magnetic structure, which is formed by flux blocking sections and flux conducting sections and wherein the flux blocking sections and flux conducting sections form poles of the rotor, wherein these flux blocking sections form channels running axially and make an axial air flow possible, wherein the laminated core of the rotor is subdivided axially into at least two component laminated cores, wherein radial cooling gaps are present in each case between the poles in the region of the q axis viewed in the circumferential direction, and viewed axially, are present between the component laminated cores.

The cooling is now improved by the inventive structure of the synchronous reluctance machine, as well as also the difference in the inductance being increased between the d and q axis of the rotor of the synchronous reluctance machine, which ultimately improves the power factor of the synchronous reluctance machine. In this power class of 300 kW and greater in this case a power factor of around 0.8 or greater is possible. The proportion of reactive power that must be made available for operating the machine can thus be reduced, which is of particular advantage in generators of wind power plants.

Viewed in the axial direction, the rotor has at least two component laminated cores, between which radial cooling gaps are present. Each flux blocking section thus has at least one cooling gap within its axial course in the rotor.

Advantageously the intermediate elements are embodied as magnetically conductive parts, so that in these sections too an additional magnetic flux can be conveyed in the rotor. The inductance in the d axis is also increased by this. These intermediate elements as magnetically conductive parts are advantageously manufactured with the same tools, e.g. punching tools, as the further laminations of the rotor. In this case they are also designed as metal laminations. By additional work steps on the intermediate elements, e.g. punching or cutting, additional options, larger cutouts, spacers, elements with a ventilation effect can be provided in these laminations.

The magnetically conductive parts of the intermediate elements can however be designed not just as laminations, but also as massive parts. This is especially of advantage when the magnetically conductive parts no longer extend as far as the air gap of the synchronous reluctance machine, since there are likely to be eddy current losses above all on the surface of the rotor.

The laminated core of the rotor is designed as axially continuous, at least in the area of the d axis. Flanking flux barriers of the d axis are additionally present, depending on the axial position in the laminated core of the reluctance rotor.

In further versions in this case, in the area of the cooling gap, the radial extent of the intermediate elements, i.e. the laminations of the d axis, can be designed radially reduced, in order to reduce eddy current losses. In such cases the radial reduction of the intermediate elements is oriented to the radial depth of the respective flux barrier.

Advantageously the difference in the inductances of the d axis and q axis of the rotor can be additionally increased when the laminated core of the rotor is designed axially around 10% longer than that of the stator. This makes for a further improvement in the power factor.

A flow of cooling air now conveyed axially, which enters into the rotor, depending on the flux blocking sections, is now diverted radially into radial cooling channels completely or at least partly. These bulkhead elements can for example be embodied from one or more individual laminations, which are preferably not magnetically conductive. The scatter losses are reduced by this.

As an alternative thereto these bulkhead elements can also be provided as laminations with cutouts with a closure of the flux blocking sections, which preferably consists in its turn of magnetically non-conductive material, such as e.g. plastic.

A flow of cooling air entering into the rotor axially via the respective flux blocking sections is subsequently—depending on the position of the flux blocking section—diverted radially in the direction of the air gap of the synchronous reluctance machine. Thereafter this flow of cooling air enters radial cooling slots and exits again on the rear side of the laminated stator core.

In one form of embodiment the radial cooling slots of the stator are arranged at least in part above the radial cooling slots of the rotor.

In a further form of embodiment the radial cooling slots of the stator are in any event not arranged above the radial cooling slots of the rotor. They are thus located at different axial positions.

Thus both the rotor and also the laminated core of the stator are now efficiently cooled. On the back of the laminated stator core, i.e. on the outer side of the stator—if the synchronous machine is designed as an inner armature—the cooling air can be collected and conveyed to one or both outlet-side winding heads, wherein on the way thereto and/or thereafter the heated cooling air flow is cooled back down by means of a heat exchanger.

BRIEF DESCRIPTION OF THE DRAWING

The invention, as well as further advantageous embodiments of the invention, will be explained in greater detail with reference to basic diagrams of exemplary embodiments. In the figures.

DETAILED DESCRIPTION OF PREFERRED EMBODIMENTS

Figure 1:
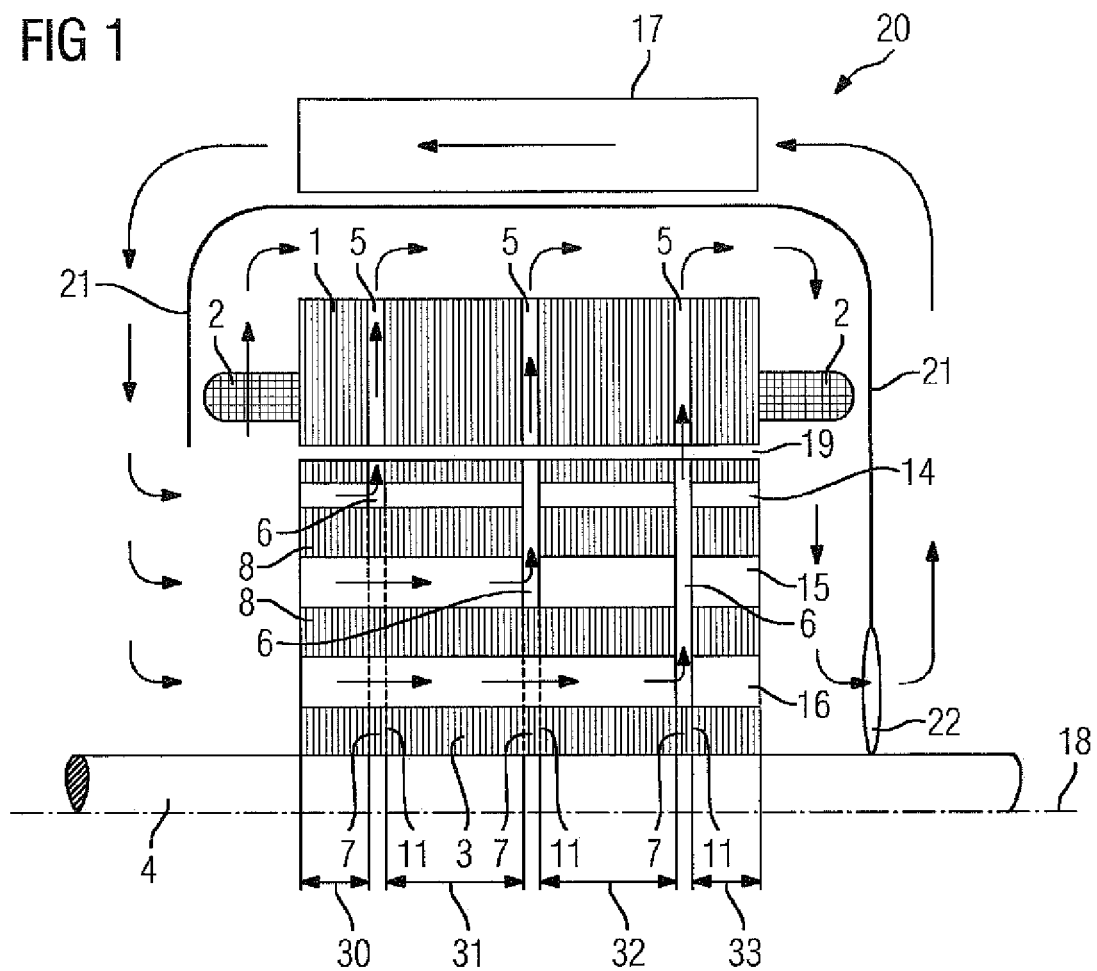
FIG. 1 shows a part longitudinal section of a synchronous reluctance machine.

FIG. 1 shows, in a part longitudinal section, a synchronous reluctance machine 20 with a stator 1, has a winding head 2 which on its axial end face sides in each case, which each belong to a winding system not shown in any greater detail, which is embedded in grooves of the stator 1 that essentially run axially.

The stator 1 is spaced apart from a rotor 3 by an air gap 19, wherein the rotor 3 is connected in a torsion-proof manner to a shaft 4 and is mounted rotatably about an axis 18. The rotor 3 is designed as a four-pole reluctance armature, wherein, viewed in the circumferential direction, four poles are formed by flux blocking sections 14, 15, 16 and flux conducting sections 8 present between said sections. In this exemplary embodiment, viewed in the radial direction, three flux blocking sections 14, 15, 16 are present.

The inventive idea is not restricted to the four-pole synchronous reluctance machine 20 but is also able to be transferred to two-pole, six-pole, eight-pole machines etc.

Located in stator 1, which is embodied as a laminated core, are axial and/or especially radial cooling channels 5, which in accordance with this exemplary embodiment, are radially flush with radial cooling channels 6 or cooling gaps of the rotor 3.

Component laminated cores 30, 31, 32, 34 of the rotor 3, which are each spaced apart from one another by intermediate elements 7, at least in the region of the q axis, are created by the radial cooling channels 6 of the rotor.

The radial cooling channels 5 of the stator 1 and the radial cooling channels 6 of the rotor 3 differ in their number and axial positioning in the axial course of the respective laminated core of stator 1 and rotor 3. The radial flush positioning of the cooling channels 5, 6 either does not occur at all or occurs for all or merely for a few predetermined cooling channels 5, 6.

The flux blocking sections 14, 15, 16 essentially form cooling channels running axially, through which a flow of cooling air can be conveyed. Bulkhead elements 11 embodied accordingly, depending on the embodiment of said bulkhead elements 11, now enable the topmost flux blocking section 14 or the middle flux blocking section 15 or the lowest flux blocking section 16 to be influenced in its course of the coolant flow and coolant throughput. In this case, either the entire cooling air flow running axially located in one of the flux blocking sections 14, 15, 16 is diverted and is conveyed radially via the air gap 19 if necessary into a cooling channel 6 of the stator 1 corresponding thereto, or only a part of the cooling air flow is diverted radially.

Figure 5:
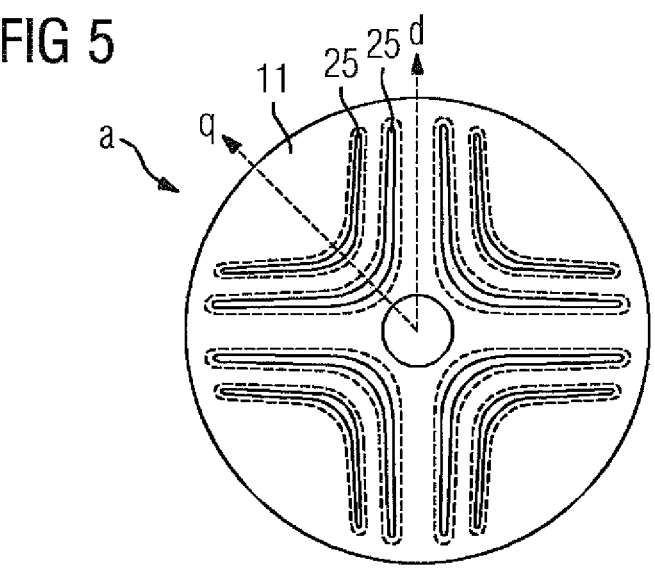
FIGS. 5a to 5b show sections through laminations of the bulkhead elements of the rotor with narrowed openings.
Figure 5:
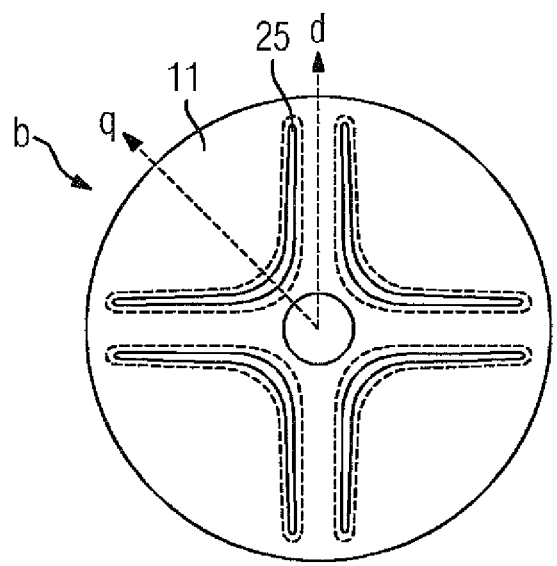
Figure 6:
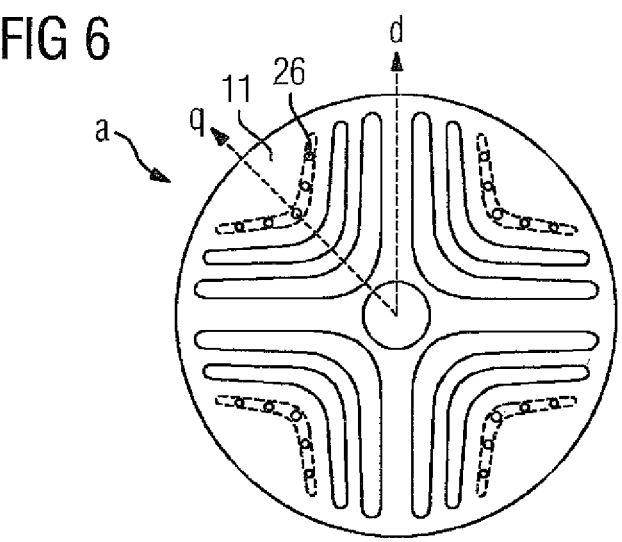
FIGS. 6a to 6c show sections through laminations of the bulkhead elements of the rotor with part openings.
Figure 6:
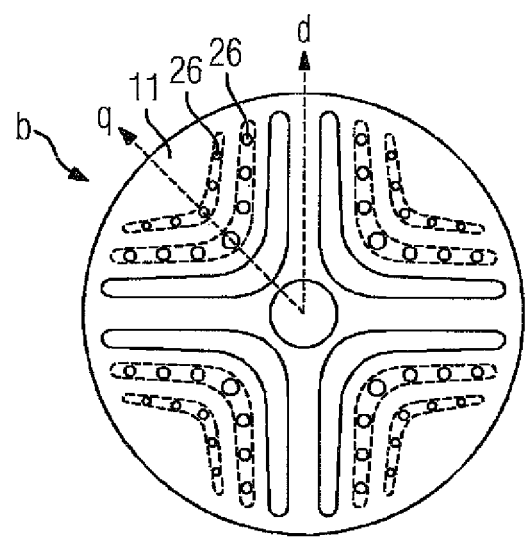
Figure 6:
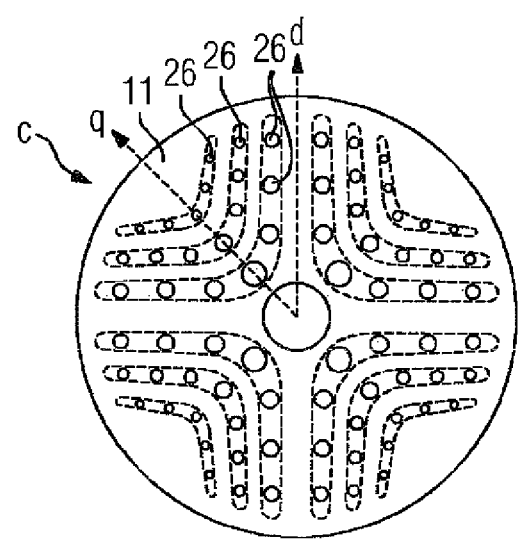

A flux barrier running axially must if necessary also "supply" two or more of its radial cooling slots 6 with cooling air as evenly as possible. To this end the through-openings 25, 26 in the bulkhead elements 11 in accordance with FIGS. 5, 6 are dimensioned accordingly for flow purposes, in that for each flux barrier 11 e.g. of a lamination according to FIG. 3Aa, a number of holes 26 or a reduced radial height or a narrowing 25 of the flux barrier 11 is provided.

Advantageously the bulkhead elements 11 are also embodied as metal laminations amagnetically. The intermediate elements 7 are provided as electromagnetically conductive parts, in order thereby to enlarge the magnetically conductive part of the rotor 1, in particular in the area of the d axis, which additionally improves the power factor of the synchronous reluctance machine 20.

Figure 7:
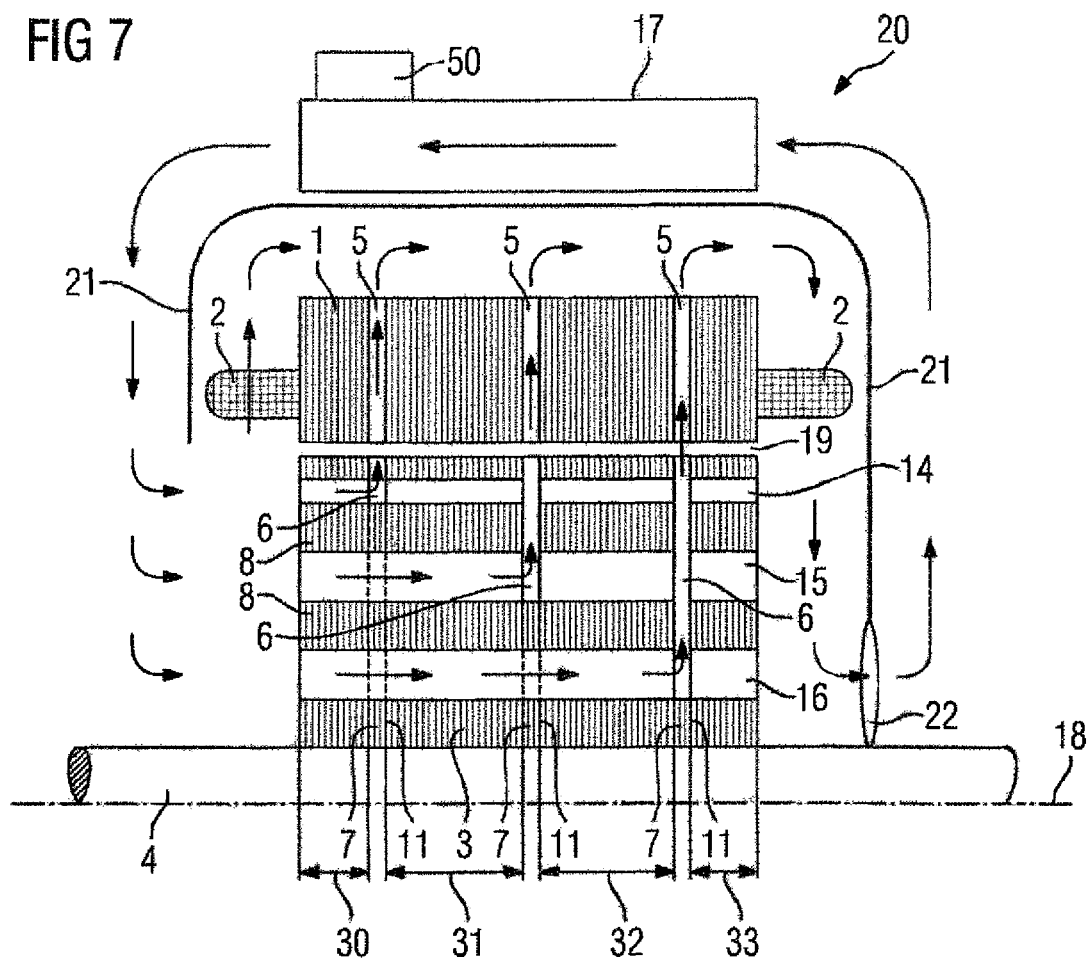
FIG. 7 shows the part longitudinal section of the synchronous reluctance machine of FIG. 1 in combination with a frequency converter.

FIG. 1 shows a single-inlet synchronous reluctance machine 20, wherein the cooling air flow only enters the machine, in particular the rotor 3, from one side. Independently of whether the cooling air now exits radially from the stator 1 and/or axially from the rotor 3, there can be a heat exchanger 17 located downstream in flow terms after the heating-up in the laminated cores of the stator 1 and rotor 3, which cools the cooling air back down to a predetermined temperature. Advantageously in this case a frequency converter 50, shown schematically in FIG. 7, is cooled back down, which can likewise be influenced by an additional or by the same heat exchanger 17 in its temperature behavior.

Diversion elements 21 shown in principle convey the cooling air, optionally driven using a fan 22, through the heat exchanger 17. The heat exchanger is not necessarily arranged radially above the stator 1. The heat exchanger 17 can for example also be located axially on the end face sides of the synchronous reluctance machine 20.

Figure 2:
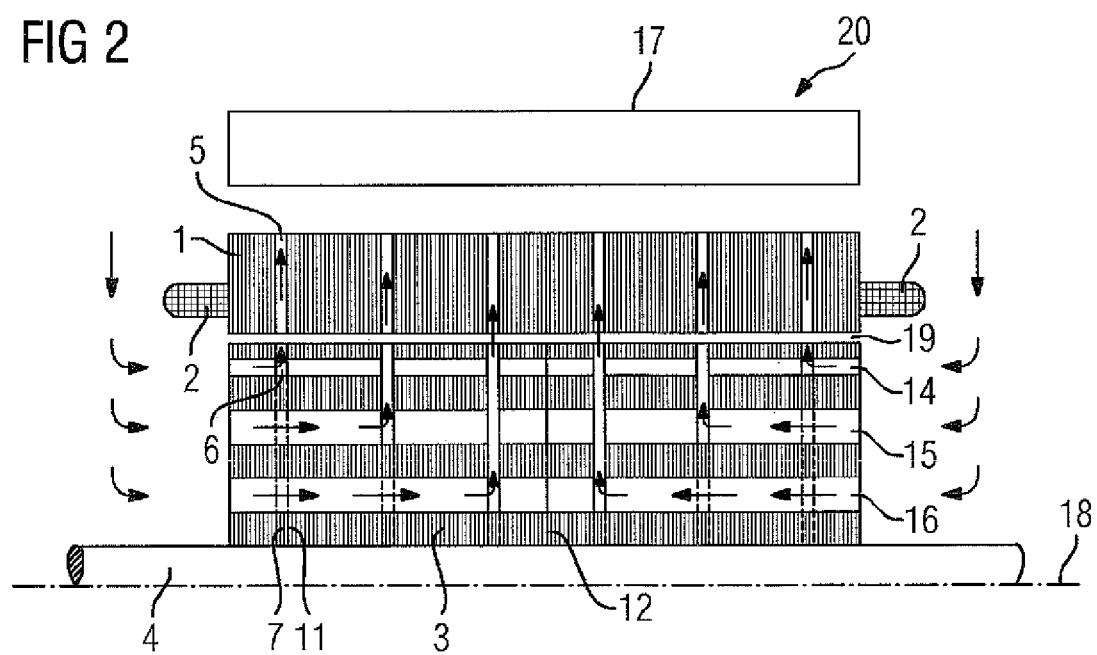
FIG. 2 shows a part longitudinal section of a further synchronous reluctance machine, FIG. 3Aa shows a section through a lamination of the component laminated cores of the rotor, FIGS. 3Bb to 3Bd show sections through laminations of the intermediate elements of the rotor, FIGS. 3Ce to 3Cg show sections through laminations of the bulkhead elements of the rotor, FIGS. 3Dh to 3Dj show sections through laminations of the bulkhead elements of the rotor with closures.

FIG. 2 shows a synchronous reluctance machine 20, which is embodied with two inlets, i.e. a flow of cooling air enters into the rotor 3 via the flux blocking section 14, 15, 16 from both the one and also the other axial end face side of the rotor 3. As described above for the single-inlet machine in accordance with FIG. 1, the cooling air is diverted in the flux blocking sections 14, 15, 16, as a result of the mechanical design, in a similar or in the same manner.

To separate the two cooling air flows to be moved towards each other, there can be a partition provided in the form of a continuous—preferably non-magnetic—partition wall 12 roughly in the middle of rotor 3 and/or rotor 3 and stator 1. This is designed, as regards its cross section, like the bulkhead elements 1 in accordance with FIG. 3Cc or 3Dj. Thus the flows of air are decoupled from one another on both sides of the partition wall 12, preferably in terms of flow, and an even distribution of the cooling air over the entire axial length of the machine is created. Scatter losses are avoided by the amagnetic design of the partition wall 12.

A conventional rotor lamination is shown in FIG. 3Aa.

The flux blocking sections 14, 15, 16 each run in the shape of an arc or in the shape of a bowl and symmetrically to the respective q axis.

Figure 3B:
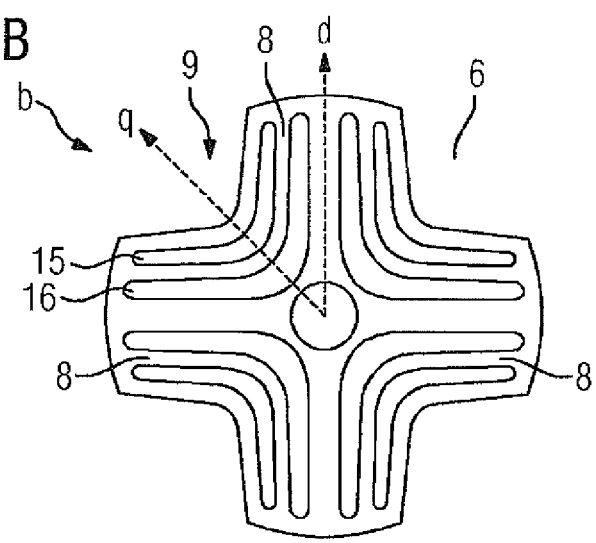
Figure 3B:
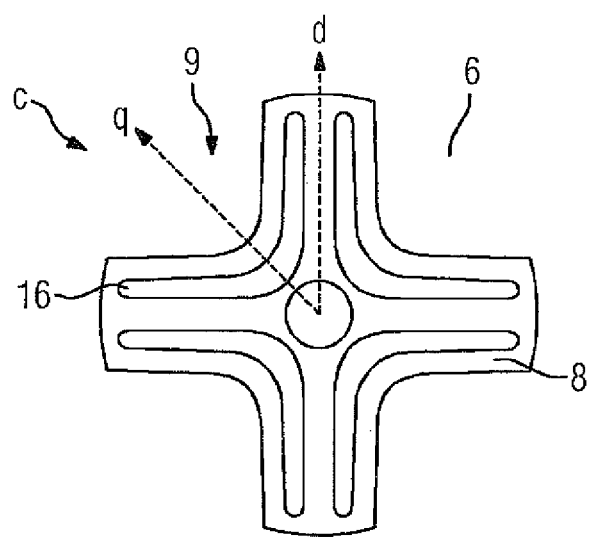
Figure 3B:
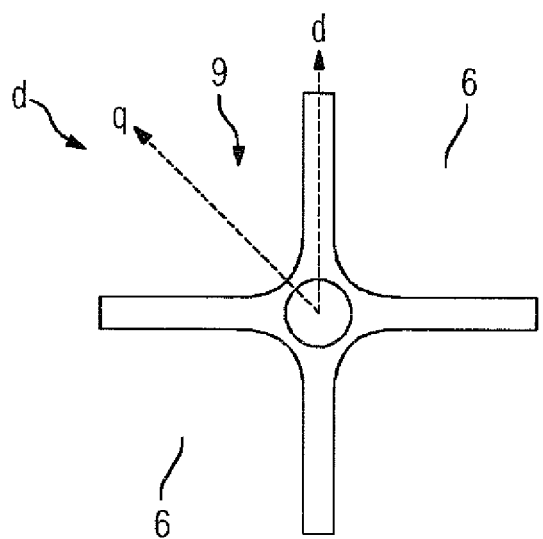

The intermediate elements 7, like the conventional rotor laminations in accordance with FIG. 3Aa, contain cutouts, which are referred to as flux blocking sections and which also convey the air in the axial direction through the rotor 3. Metal lamination sheets in accordance with FIGS. 3Bb to 3bD are provided at predetermined axial intervals, which make a radial exit from the respective flux blocking section and the rotor 3 possible for the air in the flux blocking sections. The cutouts 9 shown there extend at least from a flux blocking section, which functions as axial cooling channel, up to the outer diameter of the laminated rotor core of the rotor 3, i.e. as far as the air gap 19. Each cutout 9 between two d axes in this embodiment forms a cooling channel 6—so that with a four-pole reluctance armature—four cooling gaps 6 are present after each component laminated core.

With a six-pole or eight-pole reluctance armature there are accordingly six or eight cooling gaps after each component laminated core.

The cutout 10 in the conventional rotor lamination in accordance with FIG. 3Aa on the outer side of the rotor 3 likewise serves as a flux barrier lying on the outside of the rotor 3.

The flux barrier 10 lying on the outside in a conventional rotor lamination in accordance with FIG. 3Aa can have air, but also amagnetic material, in order to obtain a homogeneous air gap 19. This reduces the noise level, especially with high-revving machines.

Additional magnetic flux can now be conveyed in the rotor 3 by means of the magnetically conductive intermediate elements 7. The inductance in the d axis of the rotor 3 is increased thereby. The comparatively better conductance now also enables the flux barriers to be selected larger in their geometrical dimensions, in particular their radial height, whereby the inductance in the q axis falls. Thus overall a greater difference in the inductances of the d and q axis is produced and the power factor of the synchronous reluctance machine 20 is improved.

The magnetically conductive intermediate elements 7, in particular of the rotor 3, can be manufactured with the same tools, e.g. with the same punch tools, as the further laminations of the rotor 3. By additional processing of the sheets, e.g. additionally punching processes or cutting processes, suitable larger cutouts 9 or spacers can also be manufactured. The magnetically conductive intermediate elements 7 between two component laminated cores can be embodied not only as metal laminated sheets, but also as massive one-piece parts, in particular as sintered parts.

In order to reduce the eddy current losses in the magnetic intermediate elements 7, these are likewise embodied as metal laminated sheets. The number and/or the axial thickness of the intermediate elements 7 arranged axially immediately behind one another produces the axial thickness of the cooling gap 6.

In order to additionally increase the difference between the inductances $L_q$ and $L_d$ in the q axis and the d axis, the axial length of the laminated core of the rotor 3 is selected to be greater than the axial length of the laminated core of the stator 1. In this case a 10% lengthening of the laminated rotor core in relation to the laminated stator core proves to be especially suitable.

Figure 3C:
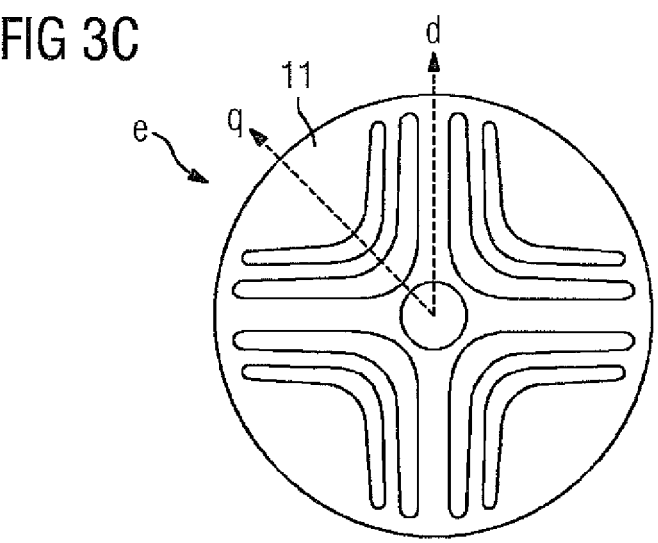
Figure 3C:
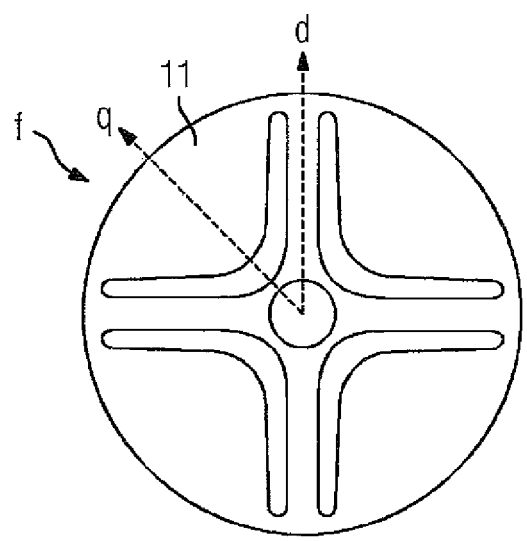
Figure 3C:
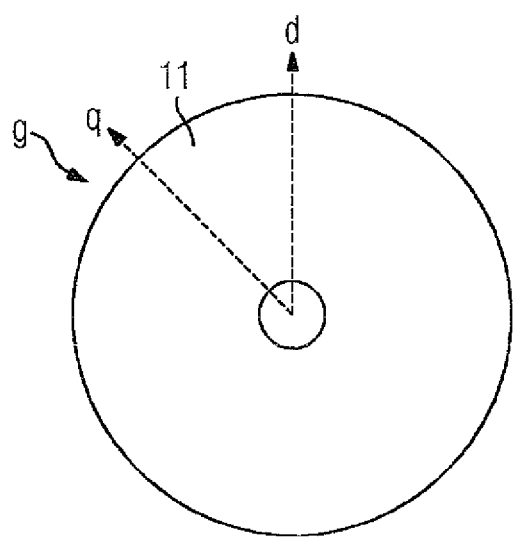

In order to now guide a flow of cooling air explicitly into the radial cooling channels 6 of the rotor 3, independently of the embodiment in accordance with the synchronous reluctance machine 20 according to FIG. 1, FIG. 2, or further conceivable versions, magnetically non-conductive bulkhead elements 11 according to FIGS. 3Ce to 3Cg are also located between the conventional laminations of the laminated rotor core according to FIG. 3Aa and the magnetically conductive intermediate elements 7 in accordance with FIGS. 3Bd to 3Bd. These bulkhead elements 11 have the effect of bringing about a radial diversion of at least one part air flow of a flux blocking section 14, 15, 16 into its respective radial cooling channel 6.

Figure 3D:
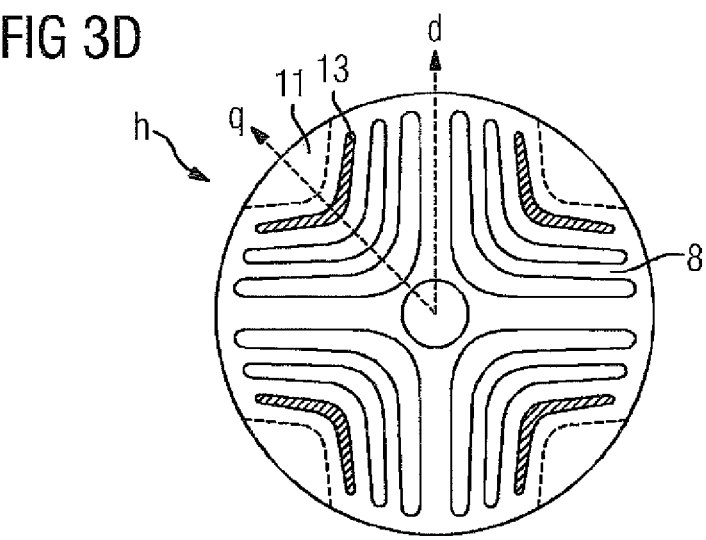
Figure 3D:
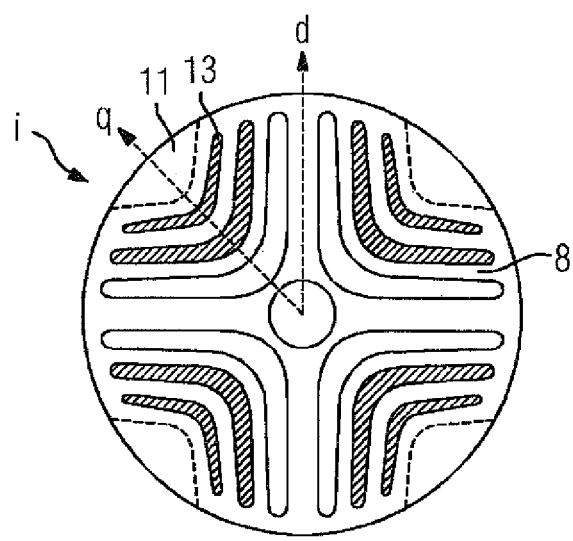
Figure 3D:
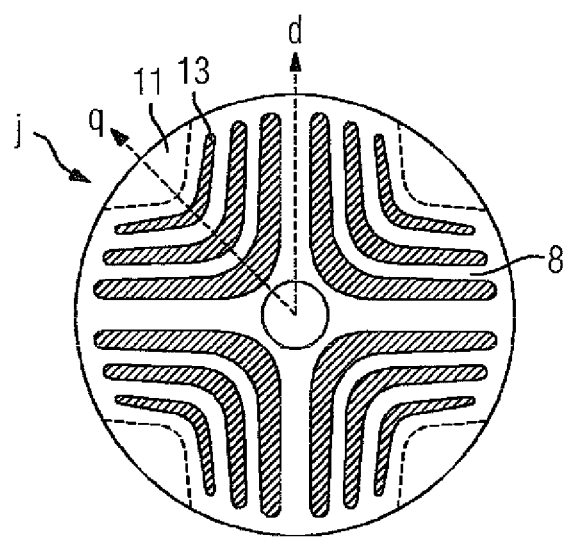

As an alternative to the bulkhead elements 11 according to FIG. 3Ce to 3Cg, sheets with cutouts according to FIG. 3Aa—i.e. magnetically conductive sheets—also with a closure 13 in accordance with FIGS. 3Dh to 3Dj, can be provided to act as a bulkhead element. This closure 13 preferably consists of magnetically non-conductive material, e.g. of plastic.

The stator 1 with its winding system and also the rotor 3 are now cooled via radial cooling channels and/or cooling channels running axially and/or via the air gap 19. In addition, by insertion of specific intermediate elements 7 in accordance with FIGS. 4a to 4c, an additional fan effect of the rotor 3 can also be created. This occurs in particular by the intermediate elements 7 in accordance with FIGS. 4a to 4c being designed with fan-like blades 14. These blades 14 can advantageously also function at the same time as axial spacers between the component laminated cores 30, 31, 32, 33 of the rotor 3.

Figure 4:
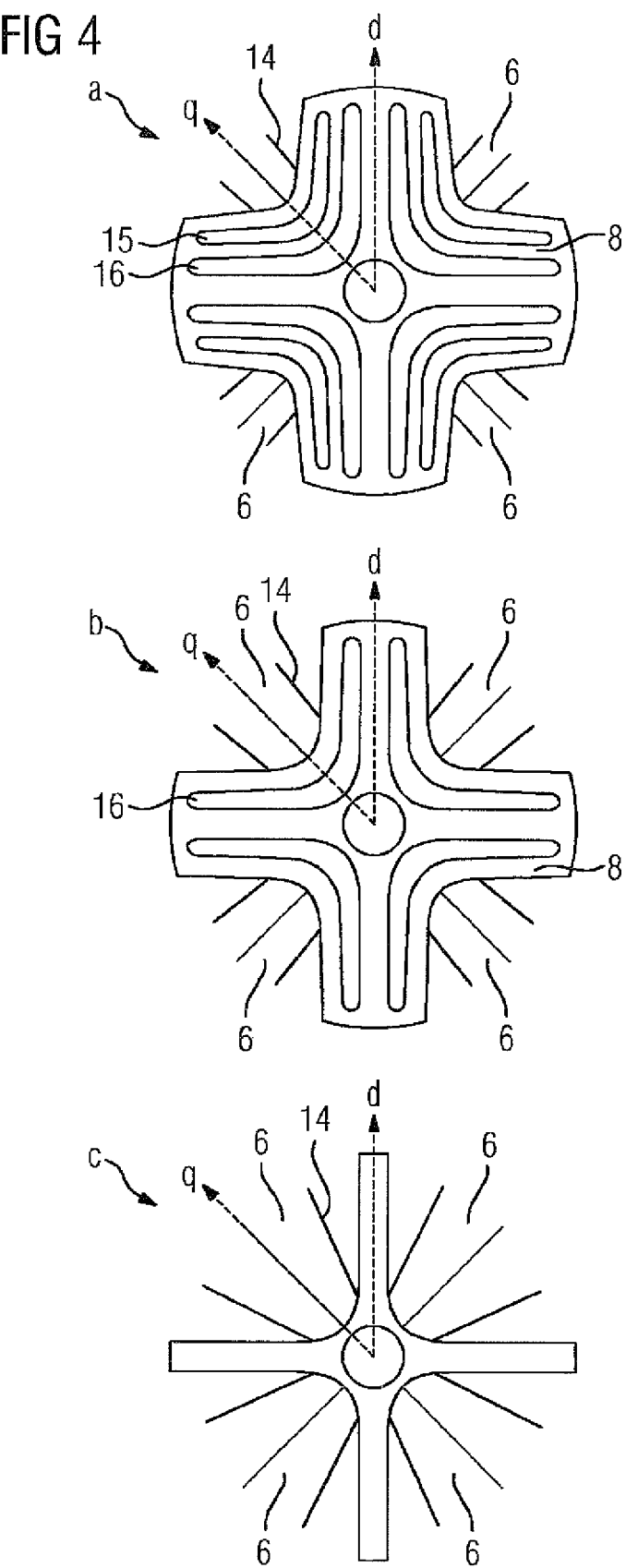
FIGS. 4a to 4c show sections through laminations of the intermediate elements of a rotor with fan blades.

Accordingly intermediate elements 7 in accordance with FIG. 3Bb to 3Bd and/or according to FIGS. 4a to 4c are also possible.

The laminated core of the rotor 3, in a single-inlet machine in accordance with FIG. 1, is now structured axially as follows. A first component laminated core 30 is constructed with conventional laminations in accordance with FIG. 3Aa. This is followed by an intermediate element in accordance with FIG. 3Bb, which has a predetermined axial thickness. It can be designed in one piece or as laminated sheets. It makes it possible for the cooling flow of this flux blocking section 14 to be directed radially outwards. This is followed in the further axial course by a bulkhead element 11 in accordance with FIG. 3Ce, 3Dh, 5a or 6a, which closes off the flux blocking section 14 completely or only in part. The flux blocking sections 15 and 16 remain axially open in this bulkhead element 11. No air exits radially outwards at this point from said flux blocking sections 15 and 16.

This is adjoined axially by a next component laminated core 31 with conventional laminations in accordance with FIG. 3Aa. This is followed by an intermediate element in accordance with FIG. 3Bc, which has a predetermined axial thickness. It can be designed in one piece but also as laminations. It makes it possible for the flow of cooling air of this flux blocking section 15 to be directed radially outwards. A part flow of air of the flux blocking section 14 can also be directed outwards here. No air exits radially outwards from the flux blocking section 16 at this point.

This is then adjoined in its further axial course by a bulkhead element 11 in accordance with FIG. 3Cf, 3Di, 5b or 6b, which closes off the flux blocking section 14, 15 axially, completely or only in part. At least the flux blocking section 16 remains open in this bulkhead element.

This is adjoined axially by a next component laminated core 32 with conventional laminations in accordance with FIG. 3Aa. This is followed by an intermediate element in accordance with FIG. 3Bd, which has a predetermined axial thickness. It can be embodied in one piece or also as laminations. It makes it possible for the flow of cooling air of this flux blocking section 16 to be conveyed radially outwards. In its further axial course it is then adjoined by a bulkhead element 11 in accordance with FIG. 3Cg, 3Dj, 5c or 6c, which, inter alia, closes off the flux blocking section axially, completely or only partly.

Also—where present—a part flow of air of the flux blocking sections 14, 15 can be diverted outwards here. At this point the air of this flux blocking section 16 exits completely from its cooling channel 6 in each case or is at least conveyed axially onwards in part, ultimately axially out of the laminated core in this case.

If the bulkhead elements 11 divert the axial air flow only partly radially, the "residual air flow" remaining in this flux blocking section can be conveyed radially and/or axially into the bulkhead elements 11 of the other flux blocking sections located downstream in flow terms.

The laminated core of the rotor 3 of these versions is embodied as axially continuous, at least in the area of the d axis. Flux barriers 14, 15, 16 of the d axis flanking it are additionally present, depending on their axial position in the laminated core of the reluctance armature—depending on which component laminated core 30, 31, 32, 33 is being considered.

With a two-inlet machine in accordance with FIG. 2 the structure described above is transferrable, starting from the two end face sides of the rotor 3 up to the partition wall 12 and the cooling principle. Ideally in this case the partition wall 12 forms the bulkhead element, which divides the two flows of cooling air flowing towards one another and steers them radially to the air gap 19.

The created flow of cooling air through the flux blocking sections 14, 15, 16 can basically be provided by the shaft fan 22 and/or external fans.

Figure 8:
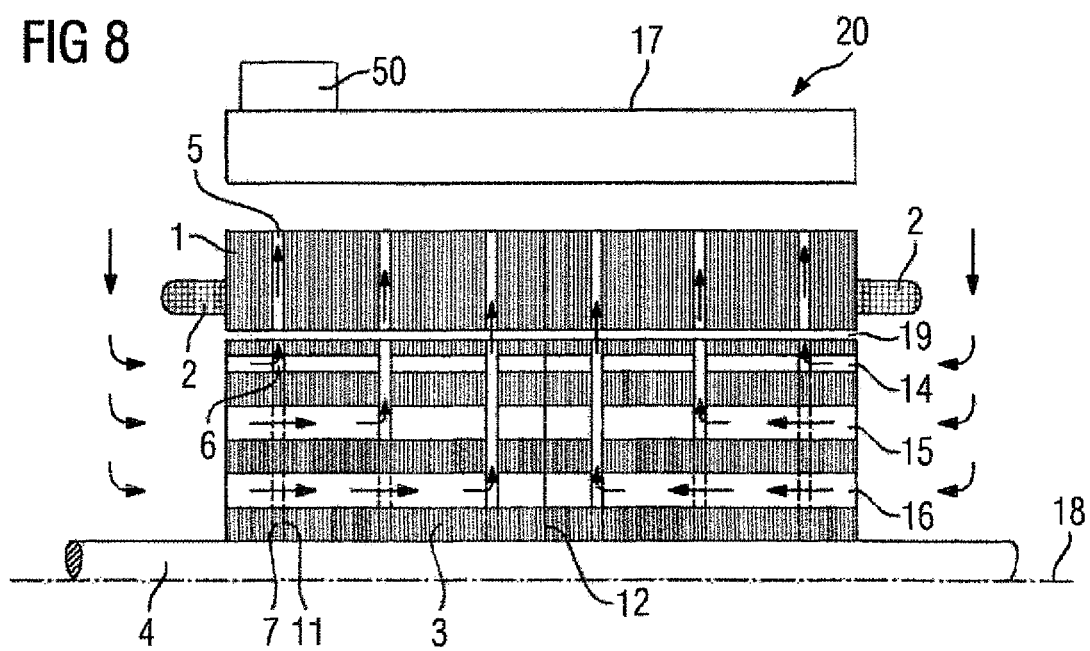
FIG. 8 shows the part longitudinal section of the further synchronous reluctance machine of FIG. 2 in combination with a frequency converter.
Figure 9:
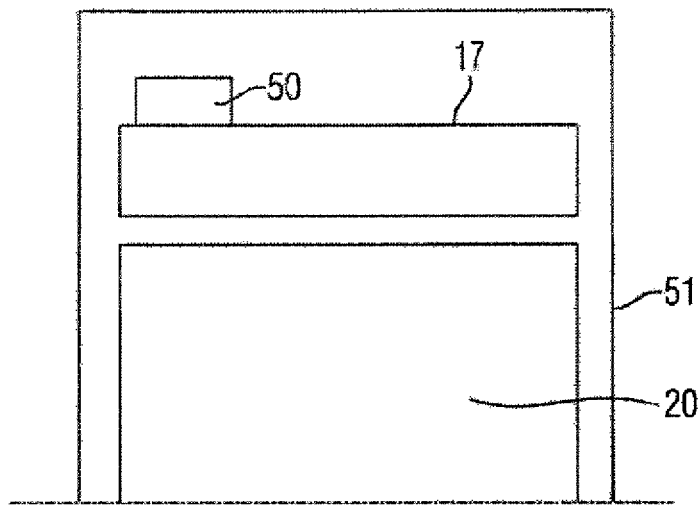
FIG. 9 shows a schematic overview of components of a wind power plant.

The inventive embodiment of the synchronous reluctance machine 20 with a frequency converter 50, shown schematically in FIGS. 7 and 8, and the higher power factor of this dynamo-electric machine connected therewith also enables it to be used as a high-speed generator in a wind power plant, which can be optimized in its temperature behavior by arrangement of a heat exchanger 17. FIG. 9 shows a schematic overview of components of the wind power plant, including generator 20 having an electrically conductive connection to the frequency converter 50, with the heat exchanger 17 being provided inside a gondola 51 of the wind power plant.

Laminated cores or component laminated cores 30, 31, 32, 33 are also to be understood as one-piece massive parts, which likewise have a magnetic conductivity.

Depending on the requirements imposed on it in the industrial environment of the synchronous reluctance machine 20 or during generation of energy by the synchronous reluctance machine 20, the reluctance armature will be equipped especially with those laminations, intermediate elements 7 or bulkhead elements 11, which guarantee the best power factor. Thus a "mixture" of the aforementioned versions of laminations, intermediate elements 7 and bulkhead elements 11 is possible for single-inlet and dual-inlet machines, but also for other cooling concepts.

The invention claimed is:

1. A synchronous reluctance machine, comprising:
   a stator; and
   a rotor spaced apart from the stator by an air gap and mounted for rotation about an axis, said rotor comprising a laminated core including laminations arranged axially behind one another, each said lamination having an anisotropic magnetic structure formed by flux blocking sections and flux conducting sections, with the flux blocking sections and flux conducting sections forming poles of the rotor, said flux blocking sections forming axial channels to enable an axial air flow, said laminated core being subdivided axially into at least two component laminated cores, with radial cooling gaps being formed in a circumferential direction between the poles in an area of an q axis and in an axial direction between the component laminated cores for enabling at least part of the axial air flow to radially exit into the air gap, with the radial cooling gap between the at least two component laminated cores being formed by an intermediate element which is magnetically conductive.

2. The synchronous reluctance machine of claim 1, constructed as a motor or generator with a power of greater than 300 kW.

3. The synchronous reluctance machine of claim 1, wherein the radial cooling gap is defined by a radial extent which, when viewed from the air gap, corresponds at most to a radial distance between a respective one of the flux blocking sections and the air gap.

4. The synchronous reluctance machine of claim 1, wherein a number of the radial cooling gaps is at least n−1, wherein n is the number of component laminated cores of the rotor.

5. The synchronous reluctance machine of claim 1, wherein the stator has radial cooling slots sized to have at least one section positioned radially over the radial cooling gaps of the rotor.

6. The synchronous reluctance machine of claim 1, wherein the radial cooling gaps have elements for conveying an axial and/or radial cooling flow in the rotor.

7. The synchronous reluctance machine of claim 1, wherein the intermediate elements are embodied in the radial cooling gaps of the rotor such that, in operation of the synchronous reluctance machine, a fan effect in radial and/or axial direction is at least supported.

8. A wind power plant, comprising:
a frequency converter;
a generator comprising a stator, and a rotor spaced apart from the stator by an air gap and mounted for rotation about an axis, said rotor comprising a laminated core including laminations arranged axially behind one another, each said lamination having an anisotropic magnetic structure formed by flux blocking sections and flux conducting sections, with the flux blocking sections and flux conducting sections forming poles of the rotor, said flux blocking sections forming axial channels to enable an axial air flow, said laminated core being subdivided axially into at least two component laminated cores, with radial cooling gaps being formed in a circumferential direction between the poles in an area of an q axis and in an axial direction between the component laminated cores for enabling at least part of the axial air flow to radially exit into the air gap, with the radial cooling gap between the at least two component laminated cores being formed by an intermediate element which is magnetically conductive;
an electrically conductive connection configured to connect the generator to the frequency converter; and
a heat exchanger disposed outside of the stator
wherein the radial cooling gaps are configured for conveying an axial and/or radial cooling flow through the generator and/or frequency converter for cooling, with the cooling flow being subsequently cooled down by the heat exchanger.

9. The wind power plant of claim 8, wherein the generator has a power of greater than 300 kW.

10. The wind power plant of claim 8, wherein the radial cooling gap is defined by a radial extent which, when viewed from the air gap, corresponds at most to a radial distance between a respective one of the flux blocking sections and the air gap.

11. The wind power plant of claim 8, wherein a number of the radial cooling gaps is at least n−1, wherein n is the number of component laminated cores of the rotor.

12. The wind power plant of claim 8, wherein the stator has radial cooling slots sized to have at least one section positioned radially over the radial cooling gaps of the rotor.

13. The wind power plant of claim 8, wherein the radial cooling gaps have elements for conveying an axial and/or radial cooling flow in the rotor.

14. The wind power plant of claim 8, wherein the intermediate elements are embodied in the radial cooling gaps of the rotor such that, in operation of the generator, a fan effect in radial and/or axial direction is at least supported.

15. The wind power plant of claim 8, further comprising a gondola, said heat exchanger provided inside of or on the gondola.

* * * * *